United States Patent
Ta et al.

(10) Patent No.: US 11,649,880 B2
(45) Date of Patent: May 16, 2023

(54) GEARBOX AND DRIVING DEVICE USING THE SAME

(71) Applicant: JOHNSON ELECTRIC INTERNATIONAL AG, Murten (CH)

(72) Inventors: Jingning Ta, Hong Kong (CN); Qiumei Li, Guangdong (CN); Baofeng Ji, Guangdong (CN); Yongjun Zhao, Guangdong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 17/615,471

(22) PCT Filed: May 27, 2020

(86) PCT No.: PCT/CN2020/092655
§ 371 (c)(1),
(2) Date: Nov. 30, 2021

(87) PCT Pub. No.: WO2020/238969
PCT Pub. Date: Dec. 3, 2020

(65) Prior Publication Data
US 2022/0205516 A1    Jun. 30, 2022

(30) Foreign Application Priority Data
May 30, 2019  (CN) .......................... 201910462384.1

(51) Int. Cl.
*F16H 1/28* (2006.01)
*F16H 57/021* (2012.01)
(Continued)

(52) U.S. Cl.
CPC ............. *F16H 1/28* (2013.01); *F16H 57/021* (2013.01); *F16H 57/08* (2013.01); *F16H 2057/02034* (2013.01); *F16H 2057/02082* (2013.01)

(58) Field of Classification Search
None
See application file for complete search history.

(56) References Cited

U.S. PATENT DOCUMENTS 3,090,258 A * 5/1963 Zinik ........................ F16H 1/46
74/411
3,144,790 A * 8/1964 Davis, Jr. .............. F16H 1/2845
475/338
(Continued)

FOREIGN PATENT DOCUMENTS

CN         101171442 A      4/2008
CN         201293074 Y  *   8/2009  ............... F16H 1/28
(Continued)

*Primary Examiner* — Dirk Wright
(74) *Attorney, Agent, or Firm* — Muncy, Geissler, Olds & Lowe, P.C.

(57) ABSTRACT

A gearbox includes a sun gear, a plurality of planetary gears meshed with the sun gear, a rotating frame supporting the planetary gears, and a housing with an internal ring gear meshed with the planetary gears. The planetary gears include a first gear and a second gear coaxially connected to each other along an axial direction and rotating synchronously, the first gear meshed with the sun gear, and the second gear meshed with the internal ring gear of the housing. The rotating frame received in the housing has an upper frame and a lower frame with a central hole, each of the plurality of planetary gears is arranged between the upper frame and the lower frame by a mounting pin, the lower frame is supported by a flange connected to the (Continued)

housing, the sun gear is driven to rotate so as to operate the rotating frame. The gearbox of the present disclosure has low vibration and low noise.

17 Claims, 8 Drawing Sheets

(51) Int. Cl.
  *F16H 57/08* (2006.01)
  *F16H 57/02* (2012.01)

(56) References Cited

U.S. PATENT DOCUMENTS

| | | | |
|---|---|---|---|
| 4,142,426 A * | 3/1979 | Baranyi | F16H 1/46 |
| | | | 475/342 |
| 8,049,384 B2 * | 11/2011 | Wilton | B60K 1/00 |
| | | | 310/83 |
| 8,672,800 B2 * | 3/2014 | Nomura | F16H 57/082 |
| | | | 475/331 |
| 8,845,472 B2 | 9/2014 | Matsuda et al. | |
| 9,028,361 B2 * | 5/2015 | Ordonez | F16H 1/28 |
| | | | 475/331 |
| 9,670,989 B2 * | 6/2017 | Hagedorn | F16H 57/0018 |
| 10,161,503 B2 * | 12/2018 | Taylor | F16H 57/082 |
| 2004/0242365 A1 | 12/2004 | Uebbing | |
| 2006/0247089 A1 | 11/2006 | Guo et al. | |
| 2015/0111685 A1 * | 4/2015 | Biermann | F16H 48/10 |
| | | | 475/248 |
| 2015/0354694 A1 * | 12/2015 | Degenhart | F16H 57/082 |
| | | | 475/331 |

FOREIGN PATENT DOCUMENTS

| | | | | |
|---|---|---|---|---|
| CN | 201293074 Y | 8/2009 | | |
| CN | 101783543 A | 7/2010 | | |
| CN | 206309875 U | 7/2017 | | |
| CN | 107355528 A | 11/2017 | | |
| CN | 108501672 A | 9/2018 | | |
| DE | 202004001063 U1 * | 5/2004 | | B23Q 5/046 |
| GB | 2258279 A | 2/1993 | | |
| JP | 1988085772 U | 6/1988 | | |
| JP | 1994018748 U | 3/1994 | | |
| JP | 1994647755 U | 6/1994 | | |
| JP | 2003130144 A | 5/2003 | | |
| JP | 2010216535 A | 9/2010 | | |
| JP | 201357369 A | 3/2013 | | |
| JP | 2013199986 A | 10/2013 | | |
| KR | 10-2006-0087477 | 8/2006 | | |

* cited by examiner

GEARBOX AND DRIVING DEVICE USING THE SAME

FIELD

The present disclosure relates to the arts of a gearbox mounted on motor, and more particularly to an driving device with gear box.

BACKGROUND

Generally, drives used for opening and closing electric tailgates of automobiles such as power lift gate, include a motor and a gearbox connected to the output shaft of the motor. When the tailgate of the trunk of the car is opened, a supporting rod is provided to support it. Due to the high frequency of use and long use time of the existing support rods, it is easy to cause the internal parts of the gearbox driving the support rods to loosen, which in turn causes noise and safety hazards when the support is used, and affects the overall service life of the support rods. The gearbox includes a multi-stage planetary gearing mechanism, which is prone to vibration and noise problems during the high-speed rotation by the motor. Therefore, in order to ensure that the internal components of the gearbox are good and the use process is safe, a new type of gear box needs to be provided to drive the support rod.

SUMMARY OF THE INVENTION

In view of this, the present disclosure provides a gearbox with improved structure, which is capable of effectively improving the reliability of components in the power lift gate.

The present disclosure discloses an electric motor comprises a casing, a stator mounted in the casing and a rotor rotating relative to the stator. The casing comprises a cylindrical shell having an opening at both ends, a division plate integrated in the cylindrical shell by impact extrusion process, an end cap made by impact extrusion process being matched with the end of the cylindrical shell by laser welding. The division plate divides the cylindrical shell into two parts of a first cavity and a second cavity, and the stator and the rotor are received in the first cavity of the casing.

Preferably, the division plate includes a main plate and a plurality of holes disposed on the main plate. The stator includes a plurality of conductive terminals extending along an axis direction of the motor, the conductive terminals respectively passing through the holes of the division plate to reach the second cavity for conducting driving signal.

Compared with the prior motor, the planetary gear of the gearbox of the present disclosure includes a first gear part and a second gear part that rotates synchronously with the first gear, which not only effectively reduces the number of parts, makes assembly simple, reduces manufacturing costs, and has stable transmission process and vibration and less noise; There is a gap between the axial end surface of the planetary gear and the inner end surface of the rotating frame, which effectively reduces the friction between the planetary gear and the frame, and has less vibration and noise.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiment.

DETAILED DESCRIPTION OF THE PREFERRED EMBODIMENTS

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

Figure 1:
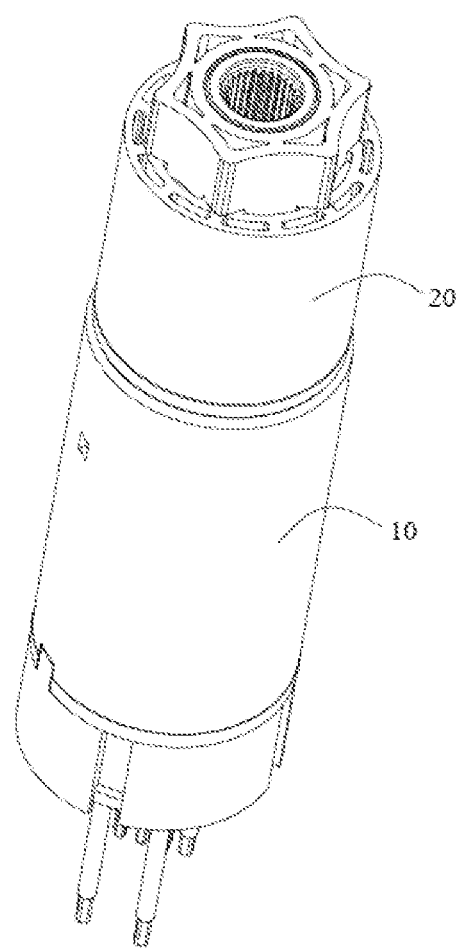
FIG. 1 is an isometric view of a driving device in accordance with an exemplary embodiment of the present disclosure.
Figure 2:
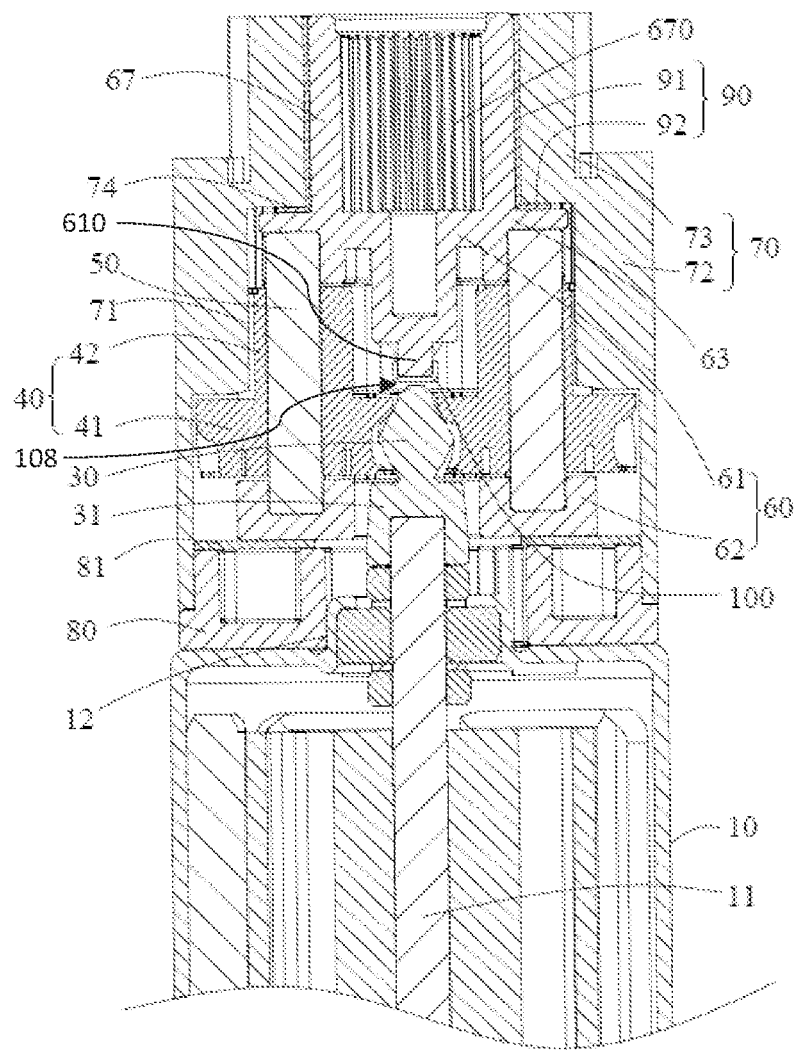
FIG. 2 is a cross-sectional view of the driving device in FIG. 1.

Referring to FIGS. 1 to 2, a driving device according to an embodiment of the present disclosure includes a motor 10 and a gearbox 20 connected to an output shaft 11 of the motor 10. The motor 10 is selected as a suitable type of motor according to needs, and its structure will not be repeated here. The gearbox 20 includes a sun gear 30 connected to the output shaft 11 of the motor 10, a first planetary gear 40 meshed with the sun gear 30, a mounting shaft 50 provided in the first planetary gear 40 to support the planetary gear 40, a rotating frame 60 accommodating the planetary gear 40, and a housing 70 sleeved outside the rotating frame 60 and meshed with the planetary gear 40. The sun gear 30 rotates synchronously with the output shaft 11, and then drives the first planetary gear 40 to rotate. While the first planetary gear 40 rotates, it also revolves around the sun gear 30 in the housing 70, thereby driving the rotating frame 60 to rotate to transmits torque to an external load.

In this embodiment, the planetary gear 40 includes a first gear 41 and a second gear 42 coaxially connected to each other along an axial direction and rotating synchronously. The first gear 41 meshes with the sun gear 30, and the second gear 42 meshes with an internal ring gear 71, the internal ring gear 71 is provided on the inner surface of the housing 70 to mesh with the second gear 42 of the plurality of first planetary gears 40. The mounting shaft 50 is installed in the planetary gear 40, and both ends of the mounting shaft 50 protrude from the axial end surface of the planetary gear 40. The mounting shaft 50 is formed integrally with the planetary gear 40, or the mounting shaft 40 may be inserted into the planetary gear 40 so that the planetary gear 40 rotates around the mounting shaft 40. The rotating frame 60 includes an upper frame 61 and a lower frame 62 with a central hole 623 that are fixedly connected. One end of the mounting shaft 50 is connected to the upper frame 61, and the other end of the mounting shaft 50 is connected to the lower frame 62. In this embodiment, the upper frame 61 and the lower frame 62 are formed separately and then connected together. Preferably, the upper frame 61 and the lower frame 62 are respectively formed by plastic injection molding, which can effectively reduce the weight of the rotating frame 60 and the entire gearbox 20, and can also reduce costs. When assembling, the two ends of the mounting shaft 50 with the planetary gear 40 can be pressed against the upper frame 61 and the lower frame 62 respectively, and then the upper frame 61 and the lower frame 62 are fixedly connected.

The first gear 41 and the second gear 42 rotate synchronously, the first gear 41 is driven to rotate by the sun gear 40, and the second gear portion 42 rotates synchronously. The second gear portion 42 meshes with the ring gear 70, and the second gear 42 rotates along the ring gear 70 when rotating, thereby driving the upper frame 62 to rotate. In the present embodiment, the two ends of the mounting shaft 50 are inserted into a receiving hole of the upper frame 61 and the lower frame 62, respectively, and the two ends of the mounting shaft 50 play a role of axial positioning. While assembled, a gap between the axial end surface of the planetary gear 40 and the inner end surface of the rotating frame 60 for avoiding friction. Optionally, the mounting shaft 50 and the planetary gear 40 are in clearance fit, the planetary gear 40 rotates around the mounting shaft 50 so as to improve the NVH (Noise, Vibration, Harshness) performance of the gearbox 20.

The gearbox 20 in this embodiment includes only one planetary gear 40, which effectively reduces the number of parts, makes assembly simple, and reduces manufacturing costs. On the other hand, the use of single-stage transmission effectively improves the transmission efficiency, and the transmission process is more stable. In this embodiment, the planetary gear 40 is positioned by the mounting shaft 50 and the rotating frame 60, and there is no need to provide a positioning surface for positioning the rotating frame 60 on the axial end surface of the planetary gear 40, which avoids the planetary gear 40 direct touches with the rotating frame 60. The above structure effectively reduces the friction between the planetary gear 40 and the rotating frame 60, and reduces the wear caused to the planetary gear 40 during the rotation of the motor 10, so as to reduce vibration and noise, thereby improve the NVH (Noise, Vibration, Harshness) performance of the gearbox 20.

Figure 3:
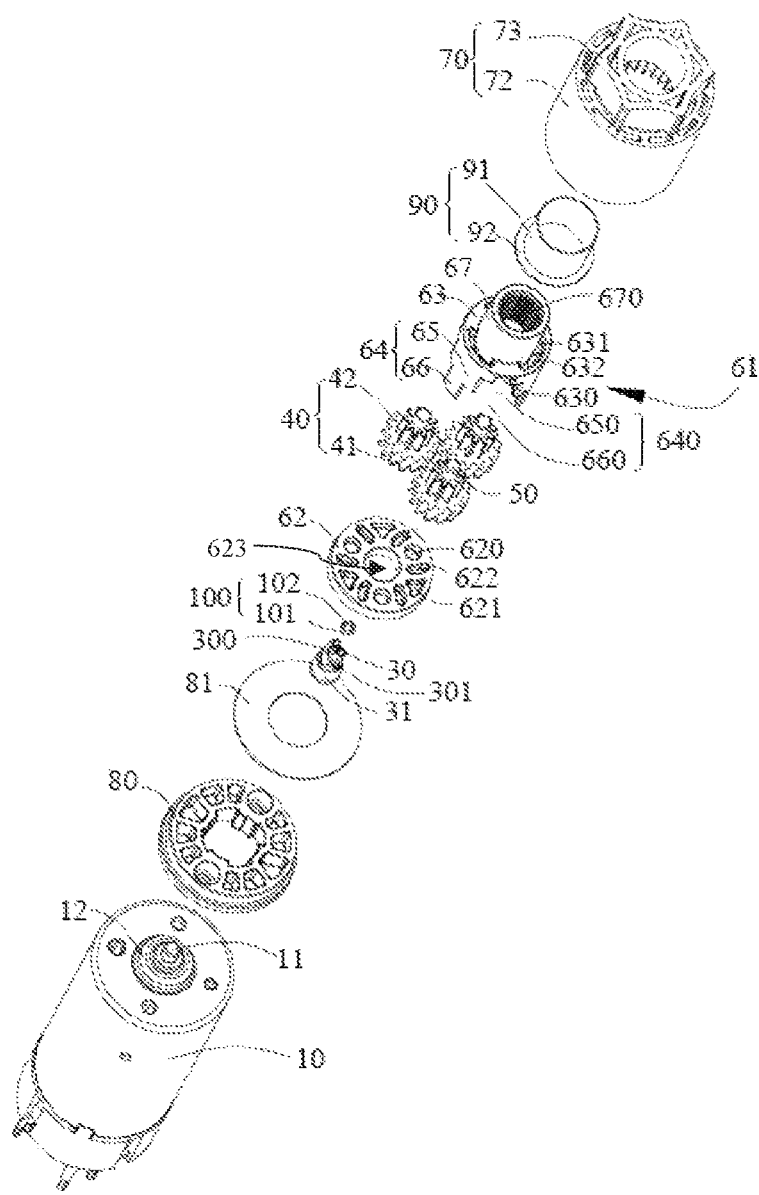
FIG. 3 is an isometric exploded view of the driving device in FIG. 1.
Figure 4:
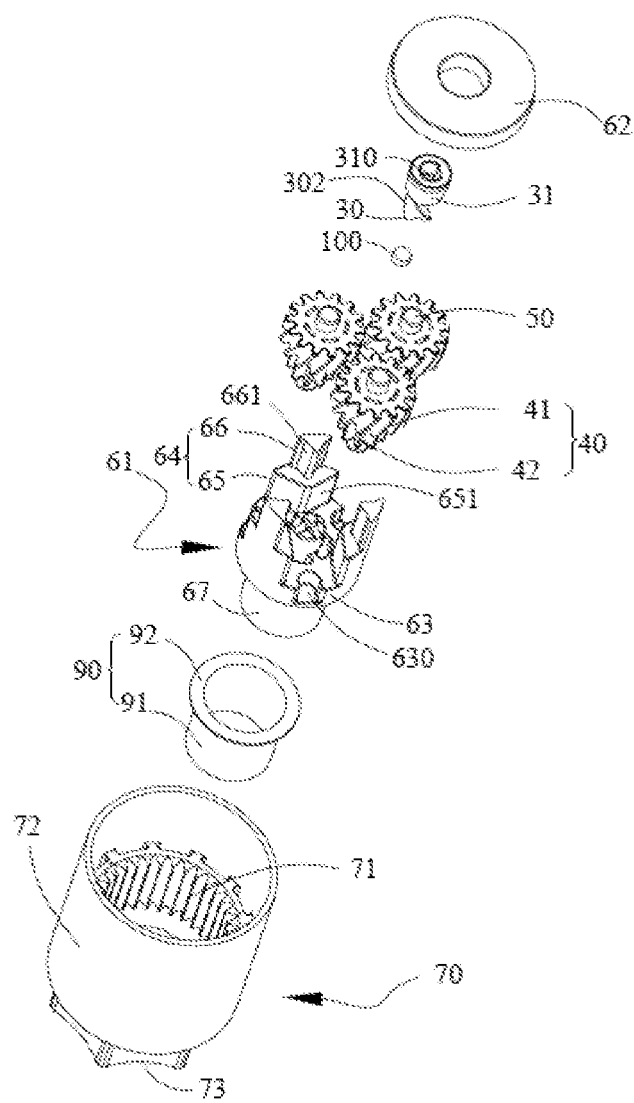
FIG. 4 is an isometric exploded view of the gearbox in FIG. 1, with a motor thereof being removed away.
Figure 5:
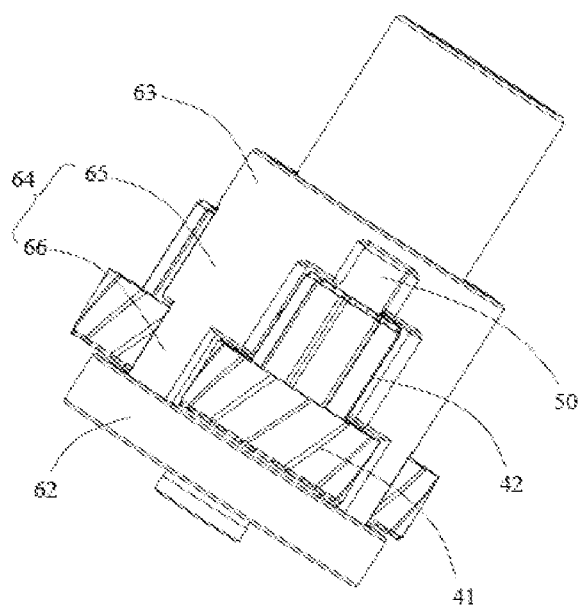
FIG. 5 is an isometric view of the gearbox in FIG. 4.

Referring to FIGS. 3 to 5, in this embodiment, three planetary gear 40 surround and mesh with the sun gear 30 at equal intervals. The number of planetary gear 40 may not be limited to this. A diameter and/or number of teeth of the first gear 41 and the second gear 42 of the planetary gear 40 may be different. Specifically, the diameter of the first gear 41 is greater than the diameter of the second gear 42, and the number of teeth of the first gear 41 is greater than the number of teeth of the second gear 42. The first gear 41 are a helical gear, and the second gears 42 are a spur gear or a helical gear. Accordingly, the sun gear 30 includes helical teeth 300 in the circumferential direction. The helical tooth 300 includes two back-facing tooth surfaces 301, 302. The tooth surface 301 faces the axial top end of the sun gear 30, and the tooth surface 302 faces the axial bottom end of the sun gear 30. The tooth surfaces 301 and 302 are curved surfaces and extend obliquely from the axial bottom end of the sun gear 30 toward the axial top end of the sun gear 30. Due to the small angle of the inclined surface, the planetary gear 40 can withstand a large reverse force to achieve self-locking. The angle between the tooth surface 301 and the axis and the angle between the tooth surface 302 and the axis are the same. This arrangement can increase the degree of coincidence of the first gear 41 and the sun gear 30, improve the transmission strength and smoothness of the planetary gear 40 and the sun gear 30, and thereby reduce vibration and noise. When the second gear portion 42 is a spur gear, the internal ring gear 71 of the housing 70 also adopts spur teeth.

The upper frame includes a disc-shaped main body 63 and a plurality of extending portions 64 extending from the peripheral edge of the main body 63 along the axial direction, and the plurality of extending portions 64 are provided at intervals along a circumferential direction. The plurality of extending portions 64 forms a receiving space 640 for placing the planetary gear 40. The main body 63 further includes an upper groove 630 for receiving one end of the mounting shaft 50, and each upper groove 630 is located between two adjacent extending portions 64. The upper groove 630 has a certain depth in the axial direction but does not penetrate the axial tip of the main body 63. The upper groove 630 is located at the edge of the main body and has an incomplete side wall, which together with the housing constrains the end of the mounting shaft 50. Corresponding to the number of the planetary gear 40, the main body 63 in this embodiment is formed with three upper grooves 630 arranged at equal intervals.

The diameters of the first gear 41 and the second gear 42 of the planetary gear 40 are different. Each extending portion 64 includes a first extending portion 65 extending from the main body portion 63 and a second extending portion 66 extending from the first extending portion 65 along the axial direction. A first space 650 is formed by the plurality of first extending portions 65 for containing the second gears 42, and a second space 660 is formed by the plurality of second extending portions 66 for containing the first gear 41.

The lower frame 62 has a disc shape. The lower frame 62 is provided with a lower groove 620 corresponding to the upper groove 630 of the upper frame 61. The lower groove 620 has a certain depth along the axial direction but does not penetrate the end surface of the lower frame 62.

One end of the mounting shaft 50 is accommodated in the upper groove 630. An axial top surface of the second gear 42 and an axial bottom surface of the main body 63 maintain a certain gap without direct contact. When the planetary gear 40 revolves, the upper frame 61 can be driven to rotate synchronously together with the mounting shaft 50. Preferably, the upper groove 630 penetrates the side wall of the main body 63, so as to facilitate the assembly of the mounting shaft 50 to the upper frame 61 in the radial direction.

The other end of the mounting shaft 50 is installed in the lower groove 620. A certain gap is maintained between an axial bottom surface of the first gear 41 and the axial top surface of the lower frame 62 without direct contact. When the planetary gear 40 revolves, the lower frame 62 can be driven to rotate synchronously together with the mounting shaft 50.

The diameter of the first gear 41 is larger than the diameter of the second gear 42 coaxially connected thereto. A diameter of the outer contour circle formed by the plurality of second gears 42 is larger than a diameter of the main body 63 of the upper frame 61. Therefore, a portion of each second gear 42 radially protrudes from the upper frame to mesh with the inner ring gear 71 of the housing 70. Similarly, a portion of each first gear 41 projects radially from between two adjacent second extending portions 66.

The lower frame 62 has a plurality of grooves 621 corresponding to the second extending portions 66 of the upper frame 61. The second extending portion 66 is inserted in the groove 621 to fix the upper frame 61 and the lower frame 62 together. Preferably, the second extending portion 66 of the upper frame 61 and the lower frame 62 are connected by laser welding, which helps to improve the connection strength of the two and further improve the strength and coaxially.

The first extending portion 65 and the second extending portion 66 are gradually contracted and narrowed from their radially outer sides to their radially inner sides, and two side surfaces 651 in the circumferential direction of the first extending portion 65 and a tooth surface of the second gear 42 maintain a certain gap, Similarly, a certain gap is maintained between two side surfaces 661 of the second extending portion 66 in the circumferential direction and a tooth surface of the first gear 41. This arrangement avoids interference with the rotation of the planetary gear 40 while improving the strength of the upper frame 61. In this embodiment, the cross sections of the first extending portion 65 and the second extending portion 66 are both generally triangular.

Understandably, according to the number of the planetary gear 40 and the relationship between the diameters of the different gears, the number of extending portion of the upper frame 61 and the relationship between the size and size of the different extensions can also be make adjustments accordingly.

The upper frame 61 has a first weight reduction groove 631 and a second weight reduction groove 632 that reduce its own weight. Similarly, the lower frame 62 has a groove 622 to reduce the weight of the lower frame 62. The groove 622 is located between the lower groove 620 and the slot 621.

The upper frame 61 further includes an output part 67. The output part 67 extends upward from the center of the main body portion 63 in the axial direction, has a hollow cylindrical shape, and has a ring tooth 670 formed on the inner surface for connecting with a load and outputting torque. In this embodiment, the outer diameter of the output part 67 is smaller than the outer diameter of the main body 63.

Referring to FIGS. 2 to 4, the housing 70 includes an axially connected first cylindrical portion 72 and a second cylindrical portion 73 that are both annular. The diameter of the first cylindrical portion 72 is larger than the diameter of the second cylindrical portion 73, thereby forming a stepped surface 74 between the first cylindrical portion 72 and the second cylindrical portion 73. The inner ring gear 71 is formed on the inner surface of the first cylindrical portion 72. The output part 67 of the upper frame 61 is accommodated in the second cylindrical portion 73. An end surface of the main body 63 of the upper frame 61 is opposed to the stepped surface 74 between the second cylindrical portion 73 and the first cylindrical portion 72.

A flange 80 is used to connect the housing 70 to a shell of the motor 10. Specifically, the shell of the motor 10 has a protruding portion 12 that is inserted into an central hole of the flange 80, and the first cylindrical portion 72 of the housing 70 is sleeved on the flange 80. The flange 80 is opposed to the lower frame 62, and a gasket 81 is arranged therebetween.

The gear box 20 further includes a protrusion 610 extending from the center of the upper frame 61 toward the sun gear 30, and a stopper 100 is installed on the protrusion 610. The material hardness of the stopper 100 is different from the material rigidity of the upper frame 61. The material hardness of the two is selected based on the principle of "soft-hard combination". For example, the stopper 100 is made of hard material (such as powder metallurgy material), the upper frame 61 is made of a material with lower hardness (such as copper). In this embodiment, the stopper 100 includes an annular side wall 101 and an abutting top surface 102 extending from the annular side wall 101. After the gear box 20 is assembled, the stopper 100 is opposed to an axial end of the sun gear 30 and maintains a gap 108.

The gear box 20 further includes a protrusion extending from the center of the upper frame 61 toward the sun gear 30, and a stopper 100 is installed on the protrusion. The material hardness of the stopper 100 is different from the material rigidity of the upper frame 61. The material hardness of the two is selected based on the principle of "soft-hard combination". For example, the stopper 100 is made of hard material (such as powder metallurgy material), the upper frame 61 is made of a material with lower hardness (such as copper). In this embodiment, the stopper 100 includes an annular side wall 101 and an abutting top surface 102 extending from the annular side wall 101. After the gear box 20 is assembled, the stopper 100 is opposed to an axial end of the sun gear 30 and maintains a gap.

The sun gear 30 further comprises a transmitting portion 31 extending in an axial direction, and a connecting gap 310 is formed on the transmitting portion 31 for receiving an output shaft 11 of the motor 10.

The sun gear 30 located between the stopper 100 and the motor shaft 11 in the axial direction floats to adapt to the radial force, the sun gear 30 has a helical gear to mesh the first gear 41. Preferably, the connecting gap 310 is non-circular, such as D-shaped, to improve the transmission stability between the output shaft 11 and the sun gear 30.

It should be noted that, in order to reduce the friction between the components, an axial gap may be provided between the components. For example, the gasket 81 is in floating contact with the flange 80 or the lower frame 62. As another example, the peripheral portion 92 of the sleeve 91 and the main body 63 of the upper frame 61 are also in floating contact.

Figure 6:
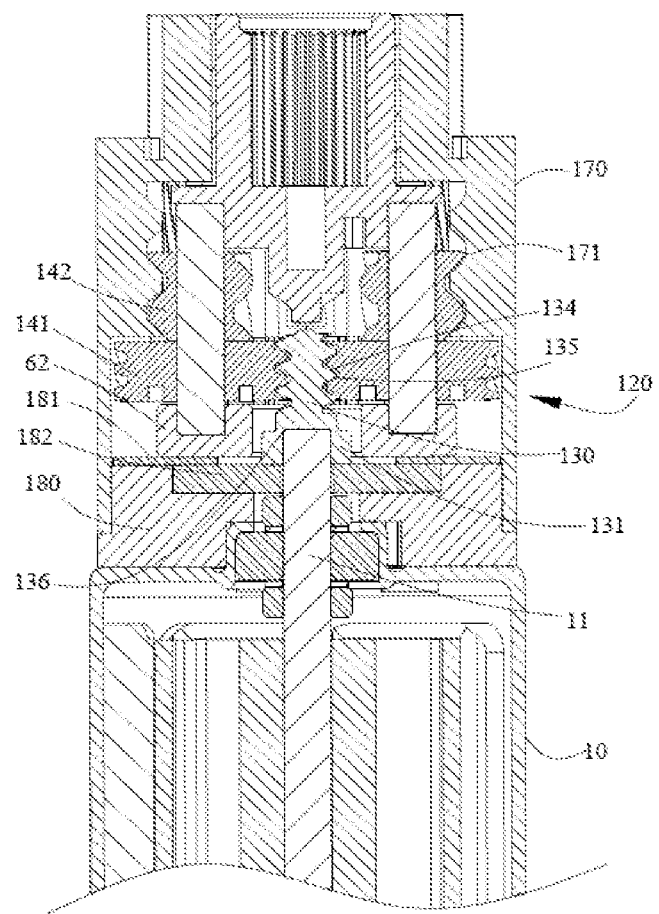
FIG. 6 is a cross-sectional view of the driving device in accordance with another embodiment of the present disclosure.
Figure 7:
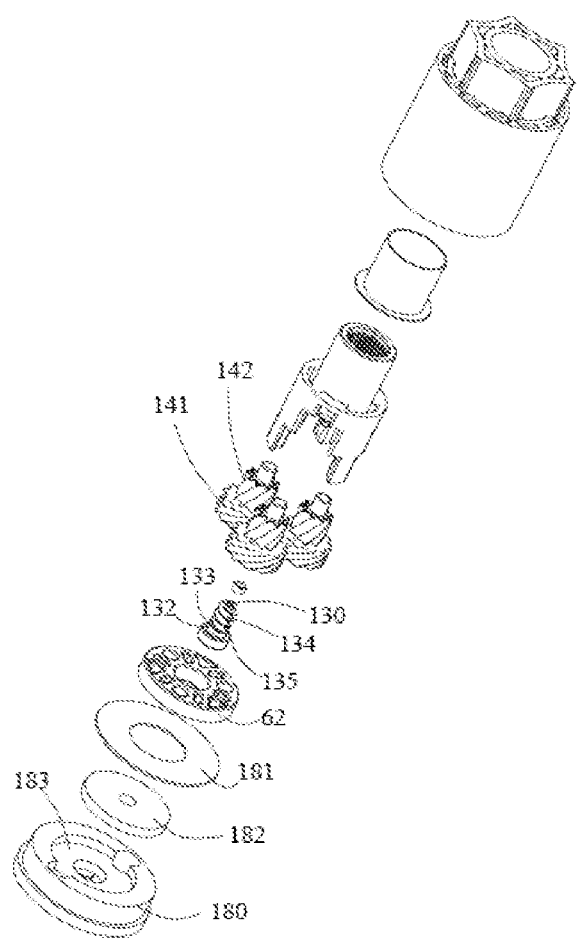
FIG. 7 is an isometric exploded view of the driving device in FIG. 6.
Figure 8:
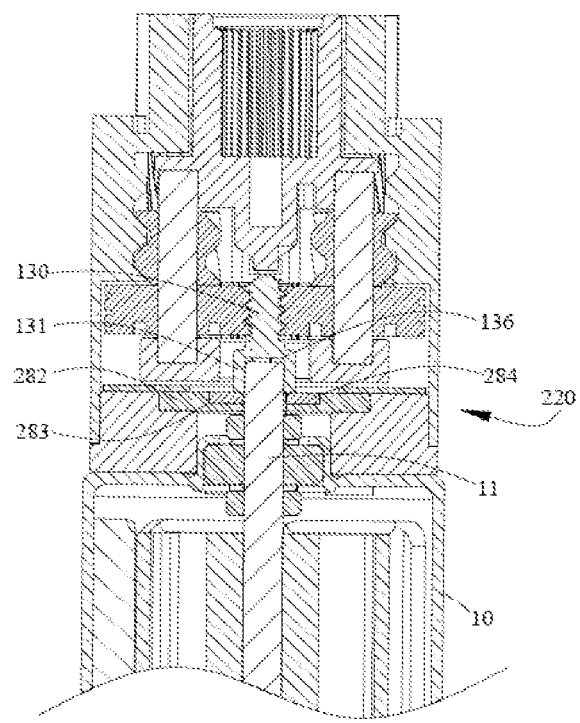
FIG. 8 is a cross-sectional view of the driving device in FIG. 6, viewed from another aspect.

FIGS. 6 to 8 show the drive device with the gearbox 20 of the second embodiment of the present disclosure. The difference between the gearbox 20 and the gearbox 20 of the first embodiment is that: the sun gear 130 is a worm, the first gear portion 141 is a worm tooth.

Specifically, the sun gear 130 includes two helical teeth 132, 133 that alternately spiral in the axial direction. Compared with the first embodiment, the angle between the helical teeth 132 and 133 of the sun gear 130 of this embodiment is larger than the angle between the helical teeth 300 of the sun gear 30 and the axis in the first embodiment. That is, the inclination angle is larger. Each helical tooth 132, 133 include two facing tooth surfaces 134, 135. The tooth surface 134 faces the axial top end of the sun gear 130, and the tooth surface 135 faces the axial bottom end of the sun gear 130. The tooth surfaces 134 and 135 are both curved surfaces and spirally extend from the axial bottom end of the sun gear 130 toward the axial top end of the sun gear 130. In this embodiment, the second gear portion 142 is a helical gear. Correspondingly, the tooth 171 on the inner surface of an housing 170 is a helical tooth. The oblique teeth of the second gear portion 142 and the oblique teeth of the first gear portion 141 have the same inclination direction, and the inclination angles are different. An angle between the helical teeth of the second gear 142 and the axis is smaller than an angle between the helical teeth of the first gear 141 and the axis.

In this embodiment, the transmission structure using a worm gear can achieve line contact between the sun gear 130 and the first gear 141, improve the transmission ratio and transmission strength, and reduce noise. Since an axial force experienced by the first gear 141 and the second gear 142 is in the opposite direction, the axial force exerted by the first gear 141 and the second gear 142 is effectively reduced.

The gearbox 120 of the second embodiment further includes a flange washer 182 arranged in the flange 180. Specifically, a receiving groove 183 is formed on the flange 180, and the flange washer 182 is received in the receiving groove 183. The surface of the flange washer 182 and the flange 180 form a coplanar. The axial end of the transmitting portion 131 of the sun gear 130 is in floating contact with the flange washer 182. A gasket 181 is located between the flange 180 and the lower frame 62. The hardness of the gasket 181 is different from that of the lower frame 62. The material hardness of the two washers is based on the principle of "soft-hard combination". For example, if the lower frame 62 is a soft material such as plastic material, then the washer 181 is a material with higher hardness and higher surface finish such as steel sheet. The flange washer 182 includes a hard body such as a metal and an insert embedded in the body with hardness lower than the body such as a self-lubricating plastic. Deformation occurs due to large axial force, and can ensure the high damping vibration reduction and low friction required by flange gasket 182. This structure can not only prevent the flange washer 182 from being deformed due to the large axial force, but also ensure the high damping vibration reduction and low friction required for the flange washer 182.

Referring to FIG. 8, a gap between the end of the output shaft 11 and the closed end of the connecting gap 310 of the transmitting portion 131, so that an axial force from the sun gear 130 to the output shaft 11 can be prevented.

While the present disclosure has been described with reference to a specific embodiment, the description of the disclosure is illustrative and is not to be construed as limiting the disclosure. Various of modifications to the present disclosure can be made to the exemplary embodiment by those skilled in the art without departing from the ture spirit and scope of the disclosure as defined by the appended claims.

The invention claimed is:

1. A gearbox comprises: a sun gear, a plurality of planetary gears supported by a carrier and meshed with the sun gear, and a housing with an internal ring gear, the internal ring gear provided on the inner surface of the housing to mesh with the plurality of planetary gears; and wherein
   each of the plurality of planetary gears comprises a first gear and a second gear coaxially connected to each other along an axial direction and rotating synchronously, the first gear meshed with the sun gear, and the second gear meshed with the internal ring gear of the housing;
   the carrier received in the housing comprises an upper frame and a lower frame with a central hole, each of the plurality of planetary gears is arranged between the upper frame and the lower frame by a mounting pin, the lower frame is supported by a flange connected to the housing, the sun gear is driven to rotate so as to operate the carrier;
   a protrusion extends from the upper frame toward the sun gear and maintains a gap with the sun gear to prevent the sun gear from displacement.

2. The gearbox according to claim 1, wherein the upper frame comprises a main body and a plurality of extending portions spaced apart from each other and extending from the peripheral edge of the main body along an axial direction, the plurality of planetary gears are accommodated in a space formed by the plurality of extending portions.

3. The gearbox as described in claim 2, wherein each of the plurality of extending portions comprises a first extending portion and a second extending portion extending from the first extending portion, a first space is formed by the plurality of first extending portions for containing the second gears, and a second space is formed by the plurality of second extending portions for containing the first gear.

4. The gearbox according to claim 2, wherein the main body is disc-shaped, and an output part extends from the main body away from the planetary gear for connecting an external load.

5. The gearbox according to claim 2, wherein a plurality of upper grooves between the extending portions for receiving an end of the mounting pin, a plurality of lower grooves is provided on the lower frame for receiving the other end of the mounting pin.

6. The gearbox according to claim 2, wherein the lower frame further comprises a plurality of slots for fixing the extending portions of the upper frame.

7. The gearbox according to claim 1, wherein a diameter of the second gear is smaller than that of the first gear, and the first gear is a helical gear, and the second gear is a spur gear or a helical gear.

8. The gearbox according to claim 7, wherein a stopper with greater rigidity than the sun gear is provided on the protrusion.

9. The gearbox according to claim 1, wherein a thrust washer for reducing friction is provided between lower frame and the flange.

10. The gearbox according to claim 1, wherein the sun gear further comprises a transmitting portion extending in an axial direction, and a connecting gap is formed on the transmitting portion for receiving an output shaft of a motor.

11. The gearbox according to claim 1, wherein a bushing for reducing friction is provided between the upper frame and the housing.

12. The gearbox according to claim 1, wherein a bushing for reducing friction is provided between the upper frame and the housing.

13. A gearbox comprises: a sun gear, a plurality of planetary gears meshed with the sun gear, and a housing with an internal ring gear, the internal ring gear provided on the inner surface of the housing to mesh with the plurality of planetary gears; and wherein
   each of the plurality of planetary gears comprises a first gear and a second gear coaxially connected to each other along an axial direction and rotating synchronously, the first gear meshed with the sun gear, and the second gear meshed with the internal ring gear of the housing;
   the carrier received in the housing comprises an upper frame and a lower frame, each of the plurality of planetary gears is arranged between the upper frame and the lower frame, the lower frame is supported by a flange connected to the housing, and the sun gear is driven to rotate the planetary gear so that the output of the carrier rotates;
   the upper frame comprises a main body and a plurality of extending portions spaced apart from each other and extending from the peripheral edge of the main body along an axial direction, the plurality of planetary gears are accommodated in a space formed by the plurality of extending portions, each of the plurality of planetary gears is arranged between the upper frame and the lower frame by a mounting pin, a plurality of upper grooves between the extending portions for receiving an end of the mounting pin, a plurality of lower grooves is provided on the lower frame for receiving the other end of the mounting pin.

14. The gearbox as described in claim 13, wherein each of the plurality of extending portions comprises a first extending portion and a second extending portion extending from the first extending portion, a first space is formed by the plurality of first extending portions for containing the second gear, and a second space is formed by the plurality of second extending portions for containing the first gear.

15. The gearbox according to claim 13, wherein a diameter of the second gear is smaller than that of the first gear, the first gear is a helical gear, and the second gear is a spur gear or a helical gear.

16. A driving device, wherein driving device comprises a motor and a gearbox,
wherein the gearbox comprises a sun gear, a plurality of planetary gears meshed with the sun gear, and a housing with an internal ring gear, the internal ring gear provided on the inner surface of the housing to mesh with the plurality of planetary gears; and wherein each of the plurality of planetary gears comprises a first gear and a second gear coaxially connected to each other along an axial direction and rotating synchronously, the first gear meshed with the sun gear, and the second gear meshed with the internal ring gear of the housing;

the carrier received in the housing comprises an upper frame and a lower frame, each of the plurality of planetary gears is arranged between the upper frame and the lower frame, the lower frame is supported by a flange connected to the housing, and the sun gear is driven to rotate the planetary gear so that the output of the carrier rotates;

an output shaft of the motor is connected to the gearbox, and the flange is seated on the motor;

a protrusion extends from the upper frame toward the sun gear and maintains a gap with the sun gear.

17. The gearbox according to claim 16, wherein a diameter of the second gear is smaller than that of the first gear, and the first gear is a helical gear, and the second gear is a spur gear or a helical gear.

\* \* \* \* \*